United States Patent [19]
Wahlberg et al.

[11] 3,913,246
[45] Oct. 21, 1975

[54] TEACHING AND LEARNING AID

[76] Inventors: Grace A. Wahlberg; Eric C. Wahlberg, both of 32 Eighth St., Stamford, Conn. 06905

[22] Filed: July 24, 1974

[21] Appl. No.: 491,542

Related U.S. Application Data

[63] Continuation-in-part of Ser. No. 372,657, June 22, 1973, abandoned, which is a continuation-in-part of Ser. No. 316,867, Dec. 20, 1972, abandoned.

[52] U.S. Cl. .................................. 35/35 C; 35/76
[51] Int. Cl.² ........................................... G09B 5/04
[58] Field of Search .......... 35/35 C, 35 G, 35 H, 76, 35/77, 75, 31 A, 31 D

[56] References Cited
UNITED STATES PATENTS

| | | | |
|---|---|---|---|
| 362,665 | 5/1887 | Safford | 35/76 |
| 1,075,248 | 10/1913 | Gancher | 35/76 |
| 1,246,860 | 11/1917 | Brachtl et al. | 35/76 UX |
| 1,351,534 | 8/1920 | Perdue et al. | 35/37 X |
| 1,394,305 | 10/1921 | Hurley | 35/76 |
| 1,887,160 | 11/1932 | Lorber | 35/37 |
| 2,974,433 | 3/1961 | Litzinger | 35/35 H |
| 3,200,517 | 8/1965 | D'Agostino | 35/35 H |
| 3,391,476 | 7/1968 | Sher | 35/35 C |

FOREIGN PATENTS OR APPLICATIONS

| | | | |
|---|---|---|---|
| 12,875 | 1900 | United Kingdom | 35/76 |
| 4,047 | 1898 | United Kingdom | 35/76 |
| 14,709 | 1913 | United Kingdom | 35/76 |
| 993,970 | 6/1965 | United Kingdom | 35/35 C |

*Primary Examiner*—Wm. H. Grieb
*Attorney, Agent, or Firm*—Alfred E. Miller

[57] ABSTRACT

A teaching and learning aid having a plurality of character imprinted tapes aligned and individually movable through a viewing area so located as to provide a continuous correlation of characters as chosen and individually moved into the viewing area, to provide the spelling of the chosen word, or the solution of a chosen mathematical problem, or the formation of a chosen sentence and such other selected application within the capabilities of the characters imprinted on the tapes. Further, the teaching and learning aid affords a means for recording the chosen characters, the solution to the problems, and the identity of the recorder. The aid additionally affords a means for teaching the characteristic sound of each character moved into the viewing area.

11 Claims, 14 Drawing Figures

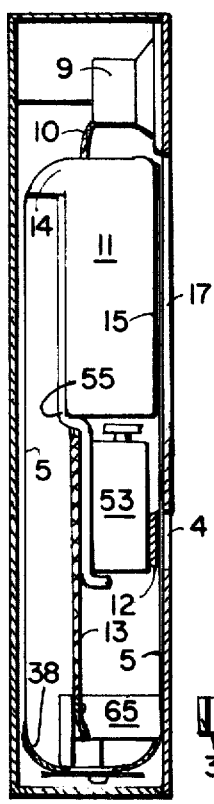
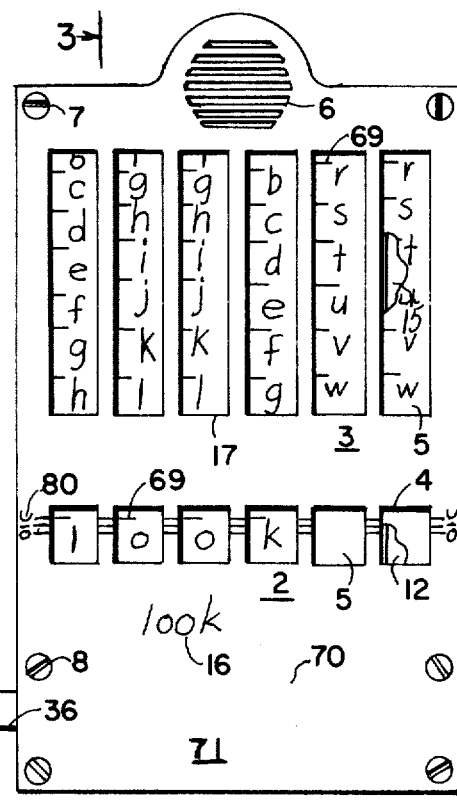
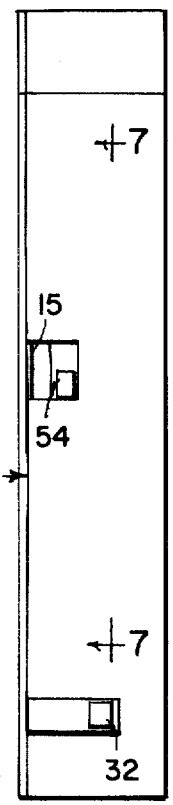
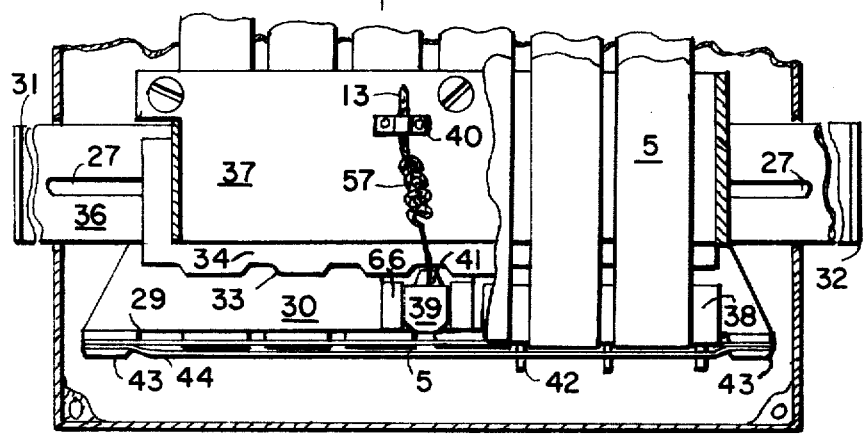
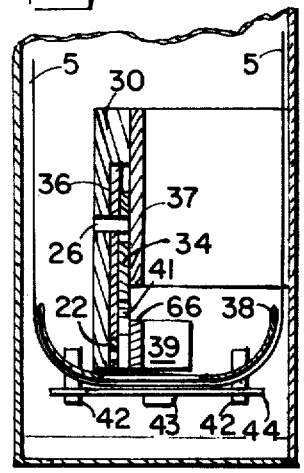
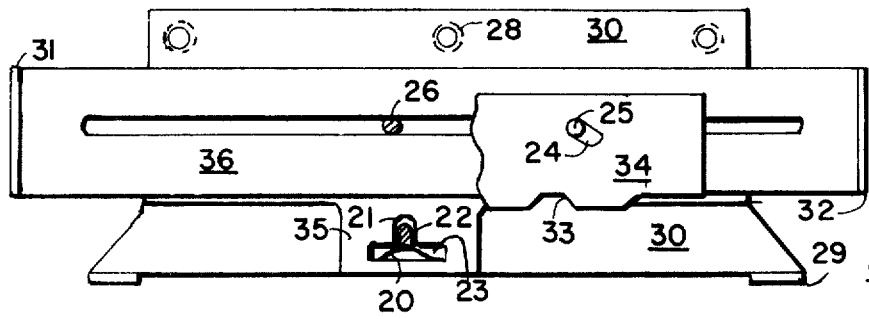

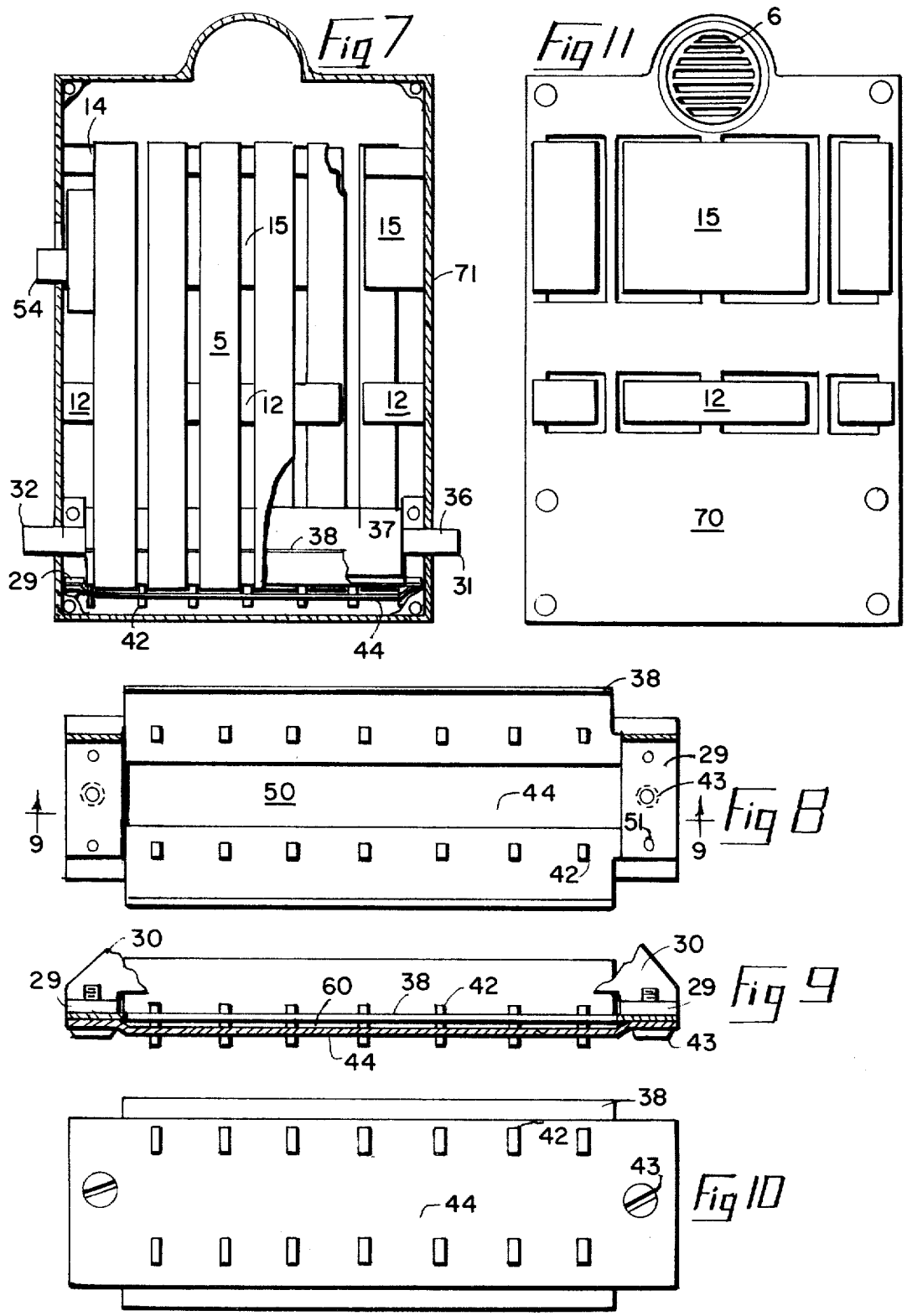

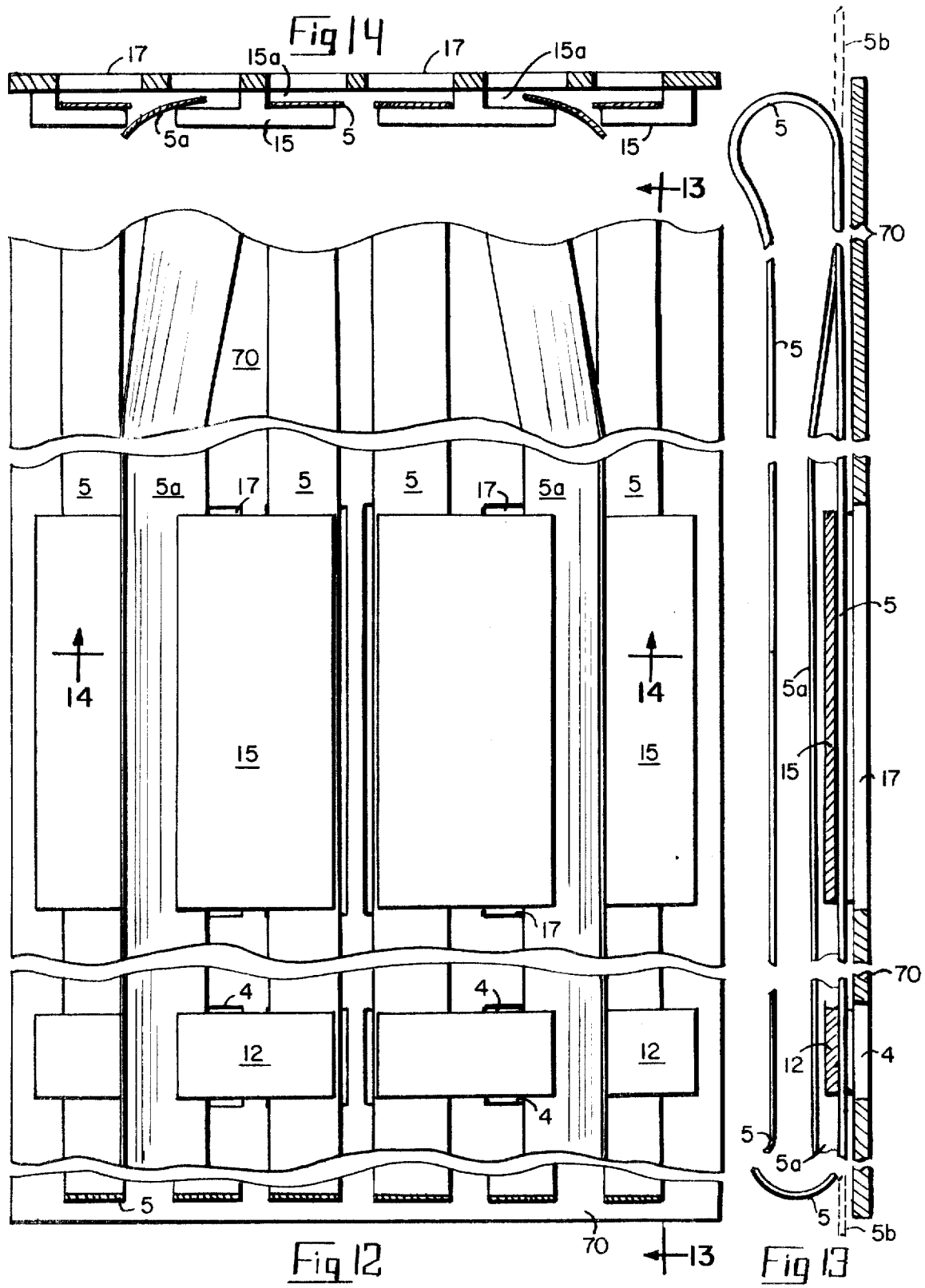

TEACHING AND LEARNING AID

The present application is a continuation-in-part of co-pending application Ser. No. 372,657 filed on June 22, 1973, now abandoned which was a continuation-in-part of Ser. No. 316,867 filed on December 20, 1072, now abandoned.

BACKGROUND OF THE INVENTION

In the teaching profession, there are many known aids that are used to help a child comprehend the forming of words, sentences, and letters in addition to forming of numbers and solving mathematical problems. One such aid consists of individual letter cards placed in a pocket chart holder to form words. These individual cards, which are loose, tend to get lost, mixed up with other cards, or fall out of the holder. Often, there is not enough space on the desk to spread the cards out for ease of retrieval for the holder. If the cards are not in alphabetical order, they are difficult to find. Moreover, the cards soil easily when handled or dropped on the floor.

Another known teaching aid is interlocking letters which are similar to parts of a jigsaw puzzle. These letters are easily lost and difficult to find when lost. Flash cards are a further form of teaching aid. The flash cards must be removed out of the file and then refiled after use. Blocks are another form of a known teaching aid. Here, again, the blocks take considerable room and are easily mixed with other sets or even lost.

As pointed hereinbefore, the prior art teaching and learning aids have serious drawbacks, and the present invention proposes to remedy these disadvantages by providing a teaching aid which is self-contained and has a number of parallel movable character carrying means which includes tapes. The characters on the tapes are placed in sequence in the viewing area to form words, letter patterns, word endings (suffixes), word beginnings (prefixes), medial and ending sounds, rhyming words, sentences, phrases, etc. This may be accomplished by rolling the letters around the guide into the revealing areas of the teaching and learning aid. When the composition of the word, for example, is completed, it may be transferred to the writing surface provided which serves as a record of the work performed.

The present invention further proposes to include the solution and teaching of mathematical problems by use of numerals as well as alphabetical characters.

It is an object of the present invention to provide a teaching aid which will incorporate all the necessary characters in a manner that will allow the formation of all grammatical and mathematical elements, formulas, and solutions in proper relationships in a convenient viewing area having a plurality of character revealing areas and to provide for the recording of the resulting group of elements.

A further object is to provide a teaching aid having fewer parts and a more reliable operation than known teaching aids.

It is desirable to parallel the word formation with the sounding out of the pronunciation of the word. Thus, a still further object of the invention is to provide an audible means correlated with the various observed characters for teaching the characteristic sound of each character and to aid in the sounding out of words and word combinations.

The invention will now be more fully described with reference to the accompanying drawings, in which:

FIG. 1 is a front elevational view of the device embodying the invention;

FIG. 2 is a side elevational view of FIG. 1;

FIG. 3 is a cross-sectional view of the device taken along the line 3—3 of FIG. 1;

FIG. 4 is an enlarged fragmentary section of the device taken along line 4—4 of FIG. 2;

FIG. 5 is a sectional view taken along line 5—5 of FIG. 4;

FIG. 6 is an enlarged elevational view of the read head guide assembly;

FIG. 7 is a sectional view of the device taken along line 7—7 of FIG. 2;

FIG. 8 is an elevational view of the tape guide assembly;

FIG. 9 is a bottom plan view of the tape guide assembly taken along lines 9—9 of FIG. 8;

FIG. 10 is a view of the tape guide assembly looking up at FIG. 9;

FIG. 11 is an elevational view of the cover assembly from inside the device;

FIG. 12 is rear elevation view of the cover and associated structure illustrated in FIG. 1 showing the teaching and learning aid unit without the audio section;

FIG. 13 is a cross-sectional view of the cover and associated structure taken along lines 13—13 of FIG. 12 and FIG. 14 is another cross-sectional view taken along the lines 14—14 of FIG. 12.

DESCRIPTION OF THE PREFERRED EMBODIMENT

FIG. 1 shows a housing 71 having a cover 70 which serves as a mounting means for the various parts of the teaching and learning aid device. The cover 70 has a general viewing area 2 with a series of individual window openings 4 for revealing each tape 5, and a motion producing area 3 having individual access openings 17 for pushing or motivating each tape 5. Tape supports 15 are located behind the tapes 5 in the motion producing area 3. Tape supports 12 may be located behind the tapes in the general viewing area 2. As seen in FIG. 1, a speaker grill 6 is located above the motion producing area 3. Screws 7, located in each corner of the cover 70, serve to assemble the cover 70 to the housing 71. Furthermore, screws 8 serve to mount the various components to the underside of the cover 70. The read head guide 36 extends out of the housing 71 on each side. A flange 32 on one end and a flange 31 on the other end of read head guide 36 serve as handles to move the read head 39 past the tapes 5 as clearly seen in FIG. 4. A switch actuator 54 extends out of the housing 71. Alphabet characters are shown on each of the tapes 5 in the motion producing area 3. As seen in FIG. 1, the word "look" is spelled out in the window openings 4 with one letter on each of the first four tapes and no letters on the last two tapes 5.

In FIG. 3, the speaker 9 is shown positioned behind the speaker grill 6 in the inside of the cover 70. Tape guide 15 is located behind the motion producing area 3 of the cover 70 with the tape 5 being guided between the tape guide 15 and the cover 70. The components for the amplifier electronics are housed in the electronics chamber 11 formed by the tape guide 15 and a cover 55. The components (not shown) may be any of the small amplifier designs known to the art and compatible with the selected read head. A battery 53 is provided as power for the amplifier and is held in place by the extension of cover 55 and tape support 12. As is well known in the art, the power supply may be designed for use on either A.C. or D.C. In the case of A.C. design, a plug would be provided on the housing 71. A lead 10 connects the amplifier circuitry with the speaker 9. Another lead 13 connects the amplifier circuitry with the read head 39, located on the tape guide assembly 65, which is mounted to the cover 70 at the opposite end to that of the speaker 9. As seen in FIG. 3, the tape 5 is shown passing through the tape guides 38 and 44, along the bottom of the housing 71, up around tape guide 14 and down between the motion producing area 3 and the support 15, and finally past the support 12 to the initial location between the tape guides 38 and 44.

Referring now to FIGS. 4, 5, and 6 in which a read head operation is shown including the tape guides assembly and the read head assemblies, the read head 39 is movably mounted on a slidable read head guide 36 which is slidably between the base 30 and cover 37. A pair of pins 25 and 26 is fixedly mounted on the base 30 and extends into slot 27 in read head guide 36 to control the movement of the read head guide 36. An extension of read head guide 36 is used to support the read head 39. This extension has a slot 21 in which pin 22 slides against a spring 20 in a slot 23 that is positioned at right angles to slot 21. The pin 22 is fixed at its projecting end to read head 39. Two spaced guides 66 are shown which are located one on each side of read head 39. These guides serve to control the vertical movement of read head 39 when the cam 41 on the read head 39 is operated by cam surface 33 of cam 34. Furthermore, the cam 34 has a pair of guide slots 24 cooperating with pins 25 and 26, respectively. The cam 34 is movably located between the read head guide 36 and the cover 37. When the read head guide 36 is moved to the right, the cam 34 is moved to the right on the pins 25 and 26. This causes cam 34 to move in a direction toward the tape guide 44. As the read head guide 36 is moved further to the right, the cam 41 on the read head 39 contacts cam surface 33 of cam 34 and forces the read head 39 toward the tape guide 44 and individual tapes 5 in sequence as the read head guide continues the move laterally across the tapes 5. An individual cam surface is provided for each tape 5 to move the read head 39 to and from each tape 5. The lead 13 is held in place on the cover by bracket 40 and is further provided with a coiled portion 57 to allow movement of read head 39 from the extreme left to the extreme right without entanglement with the read head assembly 65. The entire assembly is mounted to the cover of housing 71 by screws 8 (FIG. 1). Tape aligning guides 42 are located between each pair of tapes 5 and at each end of the guides 44 and 38. The aligning guides 42 are attached to tape guide 44 and pass through tape guide 38.

The tapes 5 are fabricated to have characters imprinted on one side, and to have a coating of material for storing data on the other side. The character imprinted side of the tapes is positioned to provide viewing of the character when in the opening area 4, while the coated side is not seen. The sound track for the sound of the character is located in the read head position for translation into sound from the speaker 9.

FIGS. 8, 9, and 10 show the assembly of tape guides 44 and 38 to each other and to the read head assembly base 30 by means of screws 43 and ears 29 on the base 30. The tape guide 38 has a slot 45 to provide clearance for head 39 to cooperate with tapes 5. Tape guide 38 may be attached to base ears 29 by means of rivets 51. The assembly of tape guides 38 and 44 provides a slot 60 wherein tapes 5 are guided between the guides 42 which pass from tape guide 44 through cooperating slots in tape guide 38. Tape guide 44 provides a backing for tapes 5 when read head 39 is used to sense the information on the tapes 5.

FIG. 11 is a rear view of the cover 70, showing the speaker grill 6 and tape guides 15 and 12 positioned in the motion producing area 3 and the window openings 4.

FIGS. 12-14 shows the details of construction more specifically, for example, than shown in FIG. 11. In this connection it should be observed that FIG. 14 shows four tapes 5 that are shown on the tape guide or supports 15 in position and two of the tapes 5a are shown being inserted part of the way into the slots 15a formed by said tape supports 15 and the adjacent spaced cover 70 in front thereof. The only support for the tapes 5 are the tape supports 12 and 15 in the back of the cover 70 which substantially cover the interior areas exposed by the window openings 4 and access openings 17. Each of the tapes 5 may be of any length greater than the distance of the combined inclusive measurement from one extreme end of one opening 17 to the extreme end of the other opening 4, as seen in FIG. 13.

As seen in FIG. 14, each of the tapes 5a are shown being inserted into the slot 15a formed by cover 70 and tape support 15. Each of the tapes 5a is also being inserted into the slot formed by cover 70 and tape support 12, as seen in FIG. 12. When fully inserted the tapes 5a will be in the same position in their respective slots as tapes 5, and ready for operation as hereinbefore described for forming words in windows 4.

While tapes 5 and 5a tapes are shown as endless tape belts, tape 5b shown in FIG. 13 in dotted lines illustrates that the tape can extend above and below the cover 80 as a strip. The tape 5b may be moved by pulling either of the free ends of the tape at either end of the cover, or by moving the tape in the same manner as described above for the belted type tape to position the letters in the windows 4. It should be apparent that although a housing 70 for the tapes is shown, it is within the scope of the invention to utilize only a face plate with window openings 4 and access openings 17 therein, but without an enclosed casing for the other structural and functional elements of the device. It can readily be seen that all tapes, 5, 5a may be easily placed in position on their corresponding tape supports 15 and 12 and that each of the tapes 5, 5a may be easily removed from their corresponding tape supports 15 and 12, thus providing for easy initial assembly and for the facility of replacement or exchange of tapes without disassembly of any of the support means with the structure.

While the embodiment described is manually operated, it is apparent to those skilled in the art that the present device may be easily automated with the use of motors or solenoids acting upon the tapes, which may have perforations along the edge to accommodate a driven sprocket; and circuitry and power supplies. In the same manner, the operation of the read head may be automated.

The operation of the teaching and learning aid is as follows: When a word such as "look" is desired to be spelled out, the first tape 5 is pushed in the motion producing area 3 until the letter "l" appears in the window opening 4. The second tape 5 is pushed until the letter "o" appears in the second window opening 4; the third tape 5 is pushed until the letter o appears in the third window opening 4; and the fourth tape 5 is pushed until the letter "k" appears in the fourth window opening. The fifth and sixth tapes 5 are pushed until the blank space appears in their respective window openings 4. If one reads from left to right, the word look appears in the series of window openings 4. The tapes 5 have been positioned in the tape guide formed by guides 44, 38, and 42 to be read by the read head 39. The recorded sound of each letter appearing in the window openings on the tapes 5 is read by the read head 39 from each tape 5 and the sound is transmitted to the speaker 9 through the amplifier unit. This is accomplished by the movement of read head guide from left to right. In moving the read head guide 36, the read head 39 travels with the read head guide 36. The read head is moved in and out from the tape 5 by the action of cam 41 on the read head 39 on the cam surface 33 of cam 34. Cam 34 is moved into position relative to the tapes 5 by the motion of read head guide 36. Read head 39 is placed in correct position with each of the tapes 5 by the action of read head cam 41 against cam surface 33 of cam 34 and the action of the pin 25 in slot 24 of the cam 34. The action of can 41 of read head 39 against cam surface 33 forces pin 22 of read head 39 to move in slot 21 toward the tapes 5, thus compressing spring 20 in slot 23. As the read head 39 continues to move across the tape 5, the read head 39 will transmit signals to the amplifier and the speaker 9, thus producing the first sound, for example, the letter l. At the right side of the first tape 5, the cam surface 33 allows the read head cam 41 to recede as spring 20 forces pin 22 to return to its normal position in slot 21. This clears the read head 39 from any obstruction that might occur as well as the left edge of the second tape 5. Further, motion of the read head guide 36 puts the read head 39 in the same position as previously described; namely, the camming into the second tape 5 and the reading of the recording on the second tape 5 to produce the sound of the letter o through the speaker 9. This procedure continues until all the tapes 5 have been read. The sound of each letter in the selected word has been produced and amplified into the speaker 9.

By moving the read head guide 36 back to the left and to initial position, the selected word may be re-read on further movement of the guide 36 to the right.

It should be noted that when moving the read head guide 36 to the left, the cam 34 is also moved slightly to the left as a result of the reaction of the slot 24 having pin 25 therein. This movement causes the cam 34 to move away from the tape 5 and allows the read head 39 to move to the left with read head guide 36 without moving the read head 39 toward the guide 36 because cam surface 41 clears the cam surface 33 of cam 34. Therefore, the cam surface 41 does not engage the cam surface 33 and no sound results when the read head moves past the tapes 5.

Because there are different sounds for short and long vowels as well as soft and hard consonants, etc., several tracks are used on each tape to accommodate these sounds. As illustrated in FIG. 1, the positioning mark 69 for sound on the tape for a letter in the window opening 4 is matched to the mark opposite the type of sound 80 on the cover 70, such as "u" for a short sound; "-" for a long sound, and o for regular sounds and others. This arrangement causes the read head 39 to read the correct track for the particular sound of the letter in the window opening 4. For the example shown herein of the word look, the positioning mark on the tape 5 having the letter l would be positioned opposite the third or o mark to give the regular sound of l. For the second and third tapes 5, the mark 69 would be placed as indicated to the short o sound. For the fourth tape, the position mark 69 would be positioned opposite the third or o mark to get the regular sound of k. Thus, when read head 39 is passed over the tapes, the sound comes out as that of look.

As seen in FIG. 1, the area 16 below the viewing area 2 may be used to record the word indicated in the window openings 4. If it is desired to write the sounds on the tapes 5, a writing head is used which is connected through circuitry to a microphone as is well known in the art. The tapes would then be positioned as explained above and sound written on the tapes as the writing head traverses the tapes.

The embodiment described indicates the use of one head moving at right angles to the tapes 5. It is within the scope of the present invention to have other embodiments which would use one head for each tape with motion in conformity with tape motion and selectively switching from one read head to another read head. One read head may be used to read the tapes by transferring the head to each tape and read each as it moves with the tape.

The present reliable teaching and learning aid is a compact, portable device that is simple to operate and can be manufactured inexpensively.

What we claim is:

1. A teaching and learning aid for demonstration of the rudiments of language, science, and the like comprising a plurality of endless spaced tape means each having a multiplicity of character thereon, a housing provided with at least one group of aligned window openings and at least one access opening, said access opening and said window openings being provided with a tape support means that is the sole support of the respective tape means, one edge of said tape support means being integral with said housing, the construction and arrangement of said tape support means forming an access means between said housing and said tape support means for enabling said tape to be assembled between said tape support means and said housing without removal of said tape support means, each of said window openings coacting with a corresponding endless elongated tape means having said characters thereon whereby movement may be selectively imparted manually to each of said endless elongated tape means in said access opening to move the selected characters on the respective endless elongated tape means into said aligned window openings to form the selected language or science learning aid.

2. A teaching and learning aid as set forth in claim 1 wherein said one edge of said tape support means is a tape guide.

3. A teaching and learning aid as recited in claim 1 wherein the width of each window opening and access opening is larger than the width of the corresponding tape support means.

4. A teaching and learning aid as recited in claim 1 wherein the plane of said tape support means is spaced from the plane of said housing by at least the thickness of said tape means.

5. A teaching and learning aid as recited in claim 1 wherein each of said windows permits only one character to be exhibited at a time, and wherein said access opening exhibits a plurality of characters at a time on each of said tape means.

6. A teaching and learning aid for demonstration of rudiments of language, science, or the like comprising a plurality of bands of tape having characters imprinted on one side thereof and the audio sound of the characters recorded on the other side of the tape, a housing provided with a plurality of aligned windows and at least one other access opening, said at least one other access opening being provided with tape support means that is the sole support of the tape, each of said window openings co-acting with a corresponding band of tape having said characters thereon whereby movement may be selectively imparted to each of said bands of tape in said access opening to move the selected characters on the respective band of tape into the aligned window openings to form the selected language or science learning aid, and a sound re-producing means mounted in said housing and being responsive to said audio sound recording, the sound being re-produced when said tape is stationary and said sound reproducing means moves relative thereto.

7. A teaching and learning aid as claimed in claim 6 wherein said tapes constitute sound memory devices, said sound reproducing means including at least one memory responsive head having means to traverse at least one of said sound memory devices and responsive to at least one of said plurality of said sound memory devices.

8. A teaching and learning aid is claimed in claim 7 wherein each of said sound memory devices has a plurality of character related sounds recorded thereon, and said memory responsive head being responsive to the recorded character related sounds on said memory devices when said head moves relative to said memory devices.

9. A teaching and learning aid as claimed in claim 7 wherein each of said sound memory devices is provided with a plurality of characters thereon which are correlated with said memory devices, said aligned window openings co-acting with a corresponding sound memory device whereby said sound reproducing means is responsive to said corresponding sound memory device when the selected character corresponding to the sound memory device is revealed in the respective window opening.

10. A teaching and learning aid as claimed in claim 8 wherein each of said sound memory devices has at least one recorded sound for each of said imprinted characters.

11. A teaching and learning aid as claimed in claim 9 wherein each of said characters has at least one position in said window openings, and each sound memory device has at least one recorded sound for each position of said character in said window openings.

* * * * *